3,511,808
POLYESTERS OF A PHENOL AND TETRAMETHYL
ADIPIC ACID
James D. Hodge, Greenville, and Richard D. Weimar, Jr.,
Grifton, N.C., assignors to E. I. du Pont de Nemours
and Company, Wilmington, Del., a corporation of
Delaware
No Drawing. Filed July 26, 1968, Ser. No. 747,822
Int. Cl. C08q 33/10, 17/08
U.S. Cl. 260—47                                    4 Claims

ABSTRACT OF THE DISCLOSURE

Linear polyesters derived from 2,2,5,5-tetramethyladipic acid and a dihydroxy aromatic compound from the group consisting of hydroquinone, 4,4'-dihydroxybiphenyl, and 2,2-bis(4-hydroxyphenyl)propane.

BACKGROUND OF THE INVENTION

Field of the invention

This invention relates to a novel class of polyesters and, more specifically, pertains to polyesters derived from a hindered aliphatic dicarboxylic acid in combination with dihydroxy aromatic compounds.

Description of the prior art

The early work on polyesters carried out by W. H. Carothers (e.g., U.S. 2,012,267) was directed primarily to polyesters prepared from aliphatic compounds. The products were found to be low melting and somewhat amorphous in character and, consequently, unsuitable for the preparation of commercial textile fibers and films. Suitable polyesters for the manufacture of textile fibers were not found until the later investigations of Whinfield & Dickson, as described in U.S. Pat. 2,465,319. These polyesters, based on the combination of terephthalic acid with an aliphatic glycol, are high-melting, have second order transition temperatures above body temperature, are relatively easily crystallized, and possess other valuable fiber-forming properties. One of these polyesters, polyethylene terephthalate, has achieved wide commercial usage in a great variety of applications because of its advantageous combination of physical properties. Frequently, however, it has been desired to improve one or more of these properties to gain superior performance in certain applications. For example, better recovery properties in a fiber are sought to provide better wash-wear characteristics in garments prepared from the fibers.

Many polyesters have been investigated with a view to finding one with recovery properties better than those of polyethylene terphthalate, but without other counteracting disadvantages. It has been found, for instance, that polyesters prepared from certain dihydroxy aromatic compounds and aliphatic dicarboxylic acids do have recovery properties superior to those of polyethylene terephthalate but are woefully inferior with respect to heat stability and resistance to hydrolytic degradation. The present invention overcomes these deficiencies.

SUMMARY OF THE INVENTION

In accordance with this invention, it has been found that valuable linear polyesters may be prepared from 2,2,5,5-tetramethyladipic acid and certain dihydroxy aromatic compounds or ester-forming derivatives thereof. Polyesters of this class are stable at temperatures above their melting points, have high second order transition temperatures, are relatively easily crystallizable, and form fibers with good recovery properties. They are particularly valuable because of their superior resistance to hydrolytic and thermal degradation.

The novel linear polyesters of the invention may be illustrated as possessing recurring units of the following structural formula:

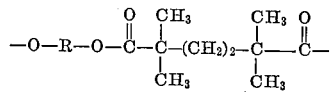

in which R is a divalent aromatic radical from the class consisting of phenylene, biphenylene, and isopropylidine-4,4'-diphenylene. These polyesters are derived from 2,2,-5,5-tetramethyladipic acid and a dihydroxy aromatic compound from the group consisting of hydroquinone, 4,4'-dihydroxybiphenyl, and 2,2-bis(4-hydroxyphenyl)propane. Usually it is preferred that the linear polyester have an inherent viscosity of at least 0.3, as measured in solution at 25° C. in a 1:3 mixture of trifluoracetic acid and methylene chloride.

A convenient method for preparing the polyesters of the invention involves first preparing a diester of the dihydroxy aromatic compound using a low molecular weight monocarboxylic acid such as acetic acid. Then this ester is heated with the tetramethyladipic acid for a suitable period of time, with the final part of the heating being carried out at very low pressure. An inert gas may be bubbled through the mixture to assist in removal of the monocarboxylic acid which is released during the reaction. The reaction may be carried out in the presence of a suitable basic catalyst such as sodium acetate, potassium acetate, lithium acetate, sodium hydroxide, and calcium acetate.

In the polymerization reaction, minor amounts (i.e., up to about 10 mole percent) of other dihydroxy compounds and other dicarboxylic acids may be present. Suitable other dihydroxy compounds include resorcinol, dihydroxydiphenyl sulfone, dihydroxydiphenyl, dihydroxydiphenylmethane, diphenylolpropane and tetrachlorodiphenylolpropane. Suitable other dicarboxylic acids include α,α,α',α'-tetramethylpimelic, terephthalic, isophthalic, bibenzoic and naphthalene-2,6-dicarboxylic acid.

Description of preferred embodiments

The expression "polymer melt temperature" (PMT) employed with respect to the products of this invention is the minimum temperature at which a sample of the polymer leaves a wet molten trail as it is stroked with moderate pressure across a smooth surface of heated metal. "Polymer melt temperature" has sometimes in the past been referred to as "polymer stick temperature."

The term "inherent viscosity" as used herein is defined by the expression $$\frac{\ln \eta r}{c.}$$

where $\eta r$ is the ratio of the drop time of the solution to the drop time of the solvent, both measured at 25° C., and c. is the solution concentration of 0.32 gm. polymer per 100 ml. solution. The solvent used is a 1:3 (by volume) mixture of trifluoracetic acid and methylene chloride. Inherent viscosity is a measure of polymer molecular weight.

Values of tensile strain recovery (TSR) for a filament are an indication of the wash-wear performance to be expected from garments prepared from such filaments. The TSR of a filament is determined by mounting a 10-inch length of the filament on a tensile tester with recording chart (commercially available from the Instron Engineering Corporation, Quincy, Mass.) and also equipped with a circulating water bath which can be raised and lowered. The water bath, maintained at 40° C., is raised to immerse the filament. After the filament has been immersed for 2 minutes without tension it is stretched, in the water bath, at an elongation rate of 1 inch per minute. Upon reaching the desired total elongation, the sample is held at constant length for an additional 2 minutes and the water bath is removed. The load on the filament is then reduced to a value of 0.042 g.p.d. and the filament is allowed to retract. Percent recovery is calculated from the formula:

$$\frac{\text{units of retraction}}{\text{units of elongation}} \times 100\%$$

This procedure is carried out for elongations of 0.5, 1, 2, and 3%; and a graph is prepared by plotting the percent recovery against total elongation in the range 0–3%. TSR values from the range 0–3% elongation which may be determined from the graph by usual graphical averaging procedures.

Filaments having TSR values of 60% are considered to have good tensile recovery, while filaments exhibiting TSR values of 70% and above are considered quite superior.

$TR_x$, tensile recovery from $x\%$ elongation, is a measure of the extent to which a fiber or a yarn recovers its original length after being stretched, as determined from a stress-strain curve. In this test, the sample is stretched at the rate of 10% of its test length per minute until it has reached approximately $x\%$ elongation, after which it is held at this elongation for 30 seconds and then allowed to retract at a controlled rate of 10% per minute, based on its original test length. The extension during the elongation and the recovery during retraction are measured along the elongation axis. $TR_x$ is then calculated as the percentage ratio of the amount of fiber retraction to the amount of its elongation. In the examples, $TR_3$ and $TR_5$ refer to tensile recovery from 3% and 5% elongation, respectively, run wet at 40° C.

$WR_y$, work recovery from $y\%$ elongation, is a measure of the freedom from permanent realignment of the polymer molecule following stretching of the fiber or yarn. The ratio of the work done by the polymer molecule in attempting to return to their original alignment following stretching to a predetermined elongation to the work done on the sample during stretching is termed the "work recovery." The work recovery is determined from the same stress-strain curve employed to measure the tensile recovery at $x\%$ elongation. $WR_y$ is calculated as the percentage ratio of the area under the controlled relaxation curve to the area under the stretching curve. In the examples, $WR_3$ and $WR_5$ refer to work recovery from 3% and 5% elongation, respectively, run wet at 40° C.

This invention is further illustrated but is not intended to be limited by the following examples in which parts and percentages are by weight, unless otherwise specified.

EXAMPLE I

A polymer tube is charged with hydroquinone diacetate (17.63 gms., 9.1×10⁻² moles), 2,2,5,5-tetramethyladipic acid (18.38 gms., 9.1×10⁻² moles), and potassium acetate (0.17 gm.). The tube is fitted with a finely-drawn capillary to admit a slow, steady stream of nitrogen and then the contents of the tube are heated for 3⅔ hrs. as the temperature is steadily raised from 220° C.–290° C. Following this, the pressure is reduced to 2 mm. mercury and the temperature maintained at 292° C. for 1½ hrs. The resulting polymer is cooled to an opaque solid and ground to pass through a #40 mesh screen in preparation for solid phase polymerization. The pulverized polymer is then heated in a nitrogen atmosphere at a pressure of 0.8 mm. mercury for 4½ hrs. at 185–200° C., and then at 220° C. for an additional 8½ hrs. The resulting polymer is found to have a PMT of 245° C. and an inherent viscosity of 1.02. The second order transition temperature is 51° C., as measured by differential thermal analysis.

A sample of the polymer pressed into film is boiled in 0.8% NaOH and found to suffer a weight loss of only 1% per hr. In the same test, polyethylene terephthalate film loses weight at the rate of about 2.5% per hr.

The polymer produced above is melt-spun at 275° C. to a fiber which is subsequently drawn 5.8× while passing over a metal plate heated to 75° C. Examination of the drawn yarn by X-ray diffraction shows it to be both crystalline and oriented. The 10 denier yarn has a tenacity of 3.0 g.p.d., a break elongation of 27.5% and an initial modulus of 49 g.p.d. Shrinkage in boiling water is found to be 18.4% and shrinkage in 160° C. dry air is 19.6%. When exposed to the dry cleaning solvent tetrachloroethylene at 60° C., shrinkage is 13%.

Samples of fiber exposed up to 120 hrs. to radiation from a zenon arc show no discoloration.

Samples of the drawn fibers are given a series of treatments simulating a fabric finishing sequence used in the textile industry. The simulated finishing sequence comprises the consecutive steps of: (a) heat treating the filaments by boiling them in water 15 minutes while allowing 3% shrinkage in length, (b) heating the filaments in an oven at 180° C. for 3 minutes, again allowing 3% shrinkage in length, (c) heat treating the filaments by boiling them in water for 15 minutes while allowing 1% shrinkage in length, and finally (d) air drying the filaments. Fiber thus treated is tested for recovery properties as described elsewhere with the results shown in Table 1. For comparison, the table also includes typical values for a commercial polyethylene terephthalate yarn.

TABLE 1

| Test | Test fiber, percent | Polyethylene terephthalate, percent |
|---|---|---|
| TSR | 81 | 65 |
| $TR_3/TR_5$ | 87/86 | 87/69 |
| $WR_3/WR_5$ | 56/56 | 42/33 |

The data in the table clearly show the superior performance of the fibers of the present invention.

EXAMPLE II

Following the general procedure of Example I, the diacetate of 4,4'-dihydroxybiphenyl is heated with an equimolar quantity of 2,2,5,5-tetramethyladipic acid and a catalytic quantity of potassium acetate. When polymerization is terminated, the polymer is found to have an inherent viscosity of 0.67 and a PMT of about 263° C.

EXAMPLE III

Following the general polymerization procedure of Example I, the diacetate of 2,2-bis(4-hydroxyphenyl)propane is heated with an equimolar quantity of 2,2,5,5-tetramethyladipic acid and a catalytic quantity of potassium acetate. Upon completion of the melt polymerization, the polymer produced is found to have an inherent viscosity of 0.27 and a PMT of 140° C.

The lower melting polymer of Example III is particularly useful in the form of a binder fiber which is compatible with fibers prepared from the polymers of Examples I and II.

What is claimed is:

1. A polymeric fiber-forming linear polyester of components consisting essentially of a dihydroxy aromatic compound and polyacid, said dihydroxy aromatic compound being selected from the group consisting of hydroquinone, 4,4'-dihydroxybiphenyl, and 2,2-bis(4-hydroxyphenyl)propane; and said polyacid is 2,2,5,5-tetramethyladipic acid.

2. Fibers of the polymer of claim 1.

3. A fiber-forming linear polyester consisting essentially of recurring units having the formula

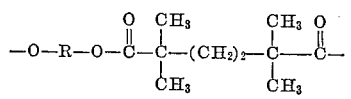

wherein R is a divalent aromatic radical selected from the group consisting of phenylene, biphenylene, and isopropylidine-4,4'-diphenylene.

4. The fiber-forming linear polyester of claim 3 having an inherent viscosity of at least 0.3, as measured at 25° C. in a solution of 0.32 gm. polymer per 100 ml. of a solution wherein the solvent is a 1:3 mixture of trifluoracetic acid and methylene chloride.

References Cited

UNITED STATES PATENTS 3,008,933  11/1961  Wielicki et al. _____ 260—75

WILLIAM H. SHORT, Primary Examiner

L. P. QUAST, Assistant Examiner

U.S. Cl. X.R.

260—31.2, 33.8